(12) United States Patent  
Asai

(10) Patent No.: US 11,553,101 B2  
(45) Date of Patent: Jan. 10, 2023

(54) COMPUTER-READABLE MEDIUM, INFORMATION PROCESSING DEVICE, AND SYSTEM FOR SETTING UP PROGRAM ON EACH TERMINAL DEVICE

(71) Applicant: BROTHER KOGYO KABUSHIKI KAISHA, Nagoya (JP)

(72) Inventor: Norihiko Asai, Tajimi (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/536,402

(22) Filed: Nov. 29, 2021

(65) Prior Publication Data

US 2022/0174170 A1 Jun. 2, 2022

(30) Foreign Application Priority Data

Nov. 30, 2020 (JP) .............................. JP2020-198019

(51) Int. Cl.
  *H04N 1/00* (2006.01)
  *H04N 1/44* (2006.01)
(52) U.S. Cl.
  CPC ..... *H04N 1/00938* (2013.01); *H04N 1/00474* (2013.01); *H04N 1/4413* (2013.01)
(58) Field of Classification Search
  CPC ........... H04N 1/00938; H04N 1/00474; H04N 1/4413
  See application file for complete search history.

(56) References Cited

U.S. PATENT DOCUMENTS

2019/0303122 A1 10/2019 Ban  
2020/0004479 A1* 1/2020 Aoki .................. H04N 1/00477  
2020/0053231 A1 2/2020 Kikuchi

FOREIGN PATENT DOCUMENTS

| JP | 2015-510635 A | 4/2015 |
| JP | 2019-175100 A | 10/2019 |
| JP | 2020-027358 A | 2/2020 |
| WO | 2013/117995 A2 | 8/2013 |

\* cited by examiner

*Primary Examiner* — Juan M Guillermety  
(74) *Attorney, Agent, or Firm* — Scully, Scott, Murphy & Presser, PC

(57) ABSTRACT

A non-transitory computer-readable medium stores computer-readable instructions that are executable by a processor of a first terminal device compatible with a first platform. The instructions are configured to, when executed by the processor, cause the first terminal device to accept selection of an image processing apparatus from among one or more devices connected with the first terminal device, obtain setting information from the selected image processing apparatus, install, into the first terminal device, a first program compatible with the image processing apparatus and the first platform, display access information on a display of the first terminal device, the access information being based on an address of a web page representing a site of a supply source for a second program that is compatible with the image processing apparatus and a second platform, and display the setting information on the display.

13 Claims, 11 Drawing Sheets

COMPUTER-READABLE MEDIUM, INFORMATION PROCESSING DEVICE, AND SYSTEM FOR SETTING UP PROGRAM ON EACH TERMINAL DEVICE

CROSS REFERENCE TO RELATED APPLICATIONS

This application claims priority under 35 U.S.C. § 119 from Japanese Patent Application No. 2020-198019 filed on Nov. 30, 2020. The entire subject matter of the application is incorporated herein by reference.

BACKGROUND

A technology to set up a program for controlling an image processing apparatus on a terminal device has been known. For instance, an installer to install a fax driver for controlling a fax machine has been disclosed.

SUMMARY

There are cases in which a single user may use the same image processing apparatus on a plurality of terminal devices having respective different platforms. In such cases, a program compatible with the image processing apparatus needs to be set up on each of the terminal devices with the different platforms. However, the program to be installed differs for each platform, and the address of a site as a program supply source differs for each program. Further, to use the image processing apparatus, the user is required to perform a time-consuming operation of inputting setting information in each terminal device. Therefore, there is room for improvement in setting up the corresponding program on each terminal device.

Aspects of the present disclosure are advantageous to provide one or more improved techniques to reduce time and effort required for a user to set up a program for controlling an image processing apparatus on each terminal device.

According to aspects of the present disclosure, a non-transitory computer-readable medium is provided, which stores computer-readable instructions that are executable by a processor of a first terminal device compatible with a first platform. The instructions are configured to, when executed by the processor, cause the first terminal device to accept selection of an image processing apparatus from among one or more devices connected with the first terminal device, obtain setting information from the selected image processing apparatus, install, into the first terminal device, a first program compatible with the selected image processing apparatus and the first platform, display access information on a display of the first terminal device, the access information being based on an address of a web page representing a site of a supply source for a second program, the second program being compatible with the selected image processing apparatus and a second platform, and display the obtained setting information on the display of the first terminal device.

According to aspects of the present disclosure, further provided is an information processing device that includes a display and a controller. The controller is configured to accept selection of an image processing apparatus from among one or more devices connected with the information processing device, the information processing device being compatible with a first platform, obtain setting information from the selected image processing apparatus, display access information on the display, the access information being based on an address of a web page representing a site of a supply source for a second-platform-compatible program, the second program being compatible with the selected image processing apparatus and a second platform, and display the obtained setting information on the display.

According to aspects of the present disclosure, further provided is a system that includes an image processing apparatus, a first terminal device compatible with a first platform, and a second terminal device compatible with a second platform. The first terminal device includes a first display and a first controller. The first controller is configured to accept selection of an image processing apparatus from among one or more devices connected with the first terminal device, obtain setting information from the selected image processing apparatus, install, into the first terminal device, a first program compatible with the selected image processing apparatus and the first platform, display access information on the first display, the access information being based on an address of a web page representing a site of a supply source for a second program, the second program being compatible with the selected image processing apparatus and the second platform, and display the obtained setting information on the first display. The second terminal device includes a reading device, a second display, and a second controller. The second controller is configured to read, by the reading device, the access information displayed on the first display of the first terminal device, thereby obtaining the access information, access the address represented by the obtained access information, obtain the web page corresponding to the selected function, and display the obtained web page on the second display, read, by the reading device, the setting information displayed on the first display of the first terminal device, thereby obtaining the setting information, and configure settings for using the image processing apparatus based on the setting information.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

An illustrative embodiment according to aspects of the present disclosure will be described with reference to the accompanying drawings. In the illustrative embodiment, aspects of the present disclosure are applied to a system including a personal computer (hereinafter referred to as a "PC"), a mobile device, and a multi-function peripheral (hereinafter referred to as an "MFP").

Figure 1:
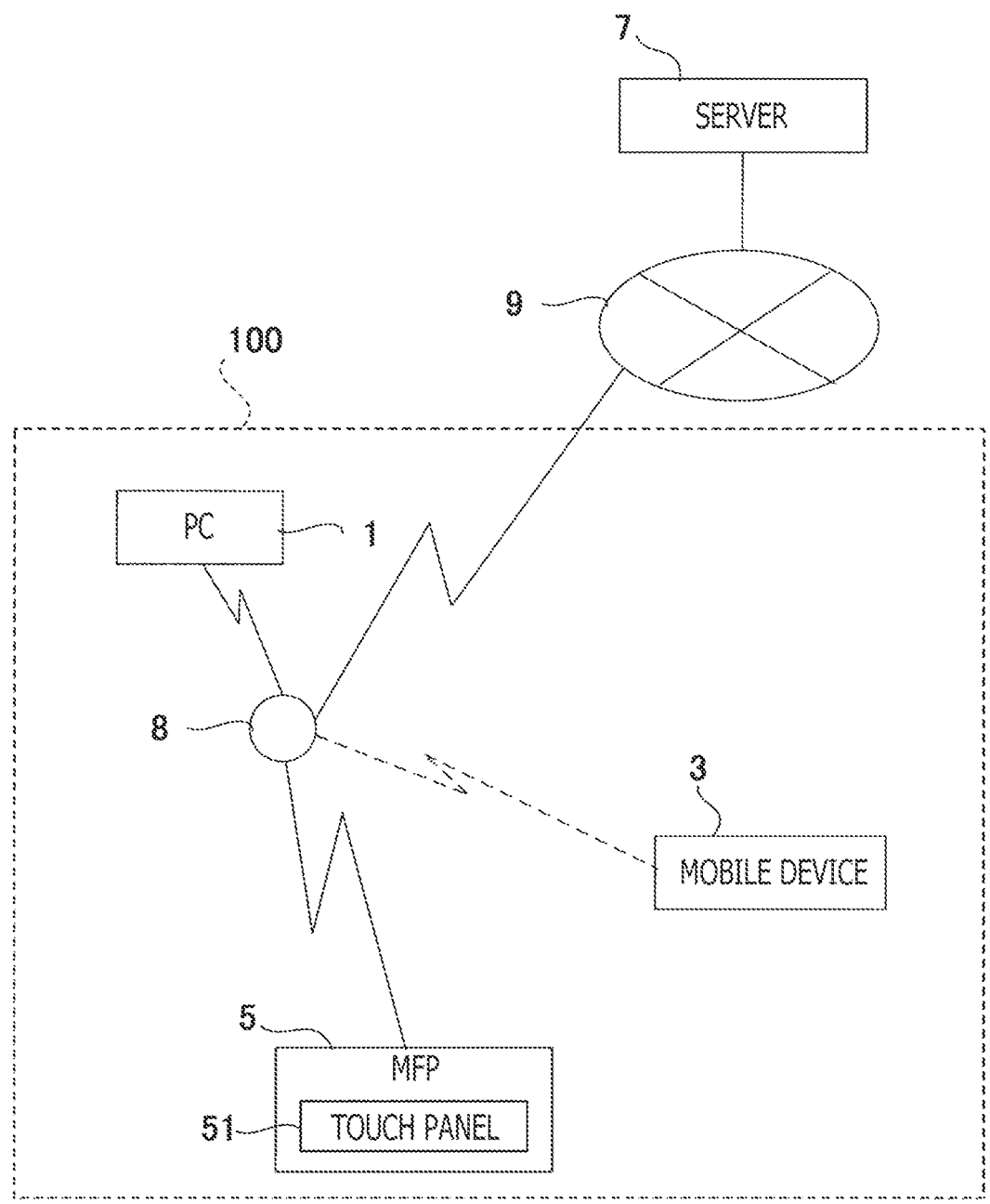
FIG. 1 schematically shows a configuration of a system including a personal computer (hereinafter referred to as a "PC"), a mobile device, and a multi-function peripheral (hereinafter referred to as an "MFP"), according to one or more aspects of the present disclosure.

FIG. 1 schematically shows a configuration of a system 100 in the illustrative embodiment. As shown in FIG. 1, the system 100 includes a PC 1, a mobile device 3, and an MFP 5. The PC 1 and the MFP 5 are connected with an access point 8, and are connected with an Internet 9 via the access point 8. On the other hand, the mobile device 3 is connected with the Internet 9 via a 4G communication line or a 5G communication line, or through an access point via Wi-Fi wireless communication ("Wi-Fi" is a registered trademark of the non-profit Wi-Fi Alliance). FIG. 1 shows a state in which the mobile device 3 has not yet been connected with the access point 8. Namely, a dashed line, connecting the mobile device 3 with the access point 8 in FIG. 1, represents a communication state before the mobile device 3 is connected with the access point 8.

The access point 8 is a relay device on a network, and is configured to mediate communication in response to a connection request from a communication terminal. For instance, the access point 8 may be a wireless Wi-Fi router ("Wi-Fi" is a registered trademark of the non-profit Wi-Fi Alliance). The access point 8 is set with an SSID, which is identification information for identifying the network. The PC 1 and the mobile device 3 are allowed to communicate with the MFP 5 via the access point 8 by setting the SSID of the access point 8 connected with the MFP 5. Further, the access point 8 is set with a password for authorizing each communication terminal to access the network. Namely, the PC 1, the mobile device 3, and the MFP 5 are authorized to connect with the network via the access point 8 in a case of successful authentication based on the password. It is noted that if the access point 8 is on a network with a different protocol from Wi-Fi, different information from the SSID may be used as identification information for identifying the network.

The MFP 5 has at least one of image processing functions such as a printing function, a scanning function, and a fax function. The MFP 5 includes a touch panel 51 having a display function and an operation function (e.g., a function as a user interface). Namely, the MFP 5 is configured to receive, via the touch panel 51, user operations such as an operation to instruct the MFP 5 to execute each function and operations to configure settings for each function. Instead of the touch panel 51, the MFP 5 may include a separate display and a separate user-operable interface device. The PC 1 is enabled to remotely control the MFP 5 by installing and setting up, on the MFP 5, a print application 23 (see FIG. 2) compatible with a model of the MFP 5. Further, the mobile device 3 is enabled to remotely control the MFP 5 by installing and setting up, on the mobile device 3, a print application 43 (see FIG. 3) compatible with the model of the MFP 5.

Figure 2:
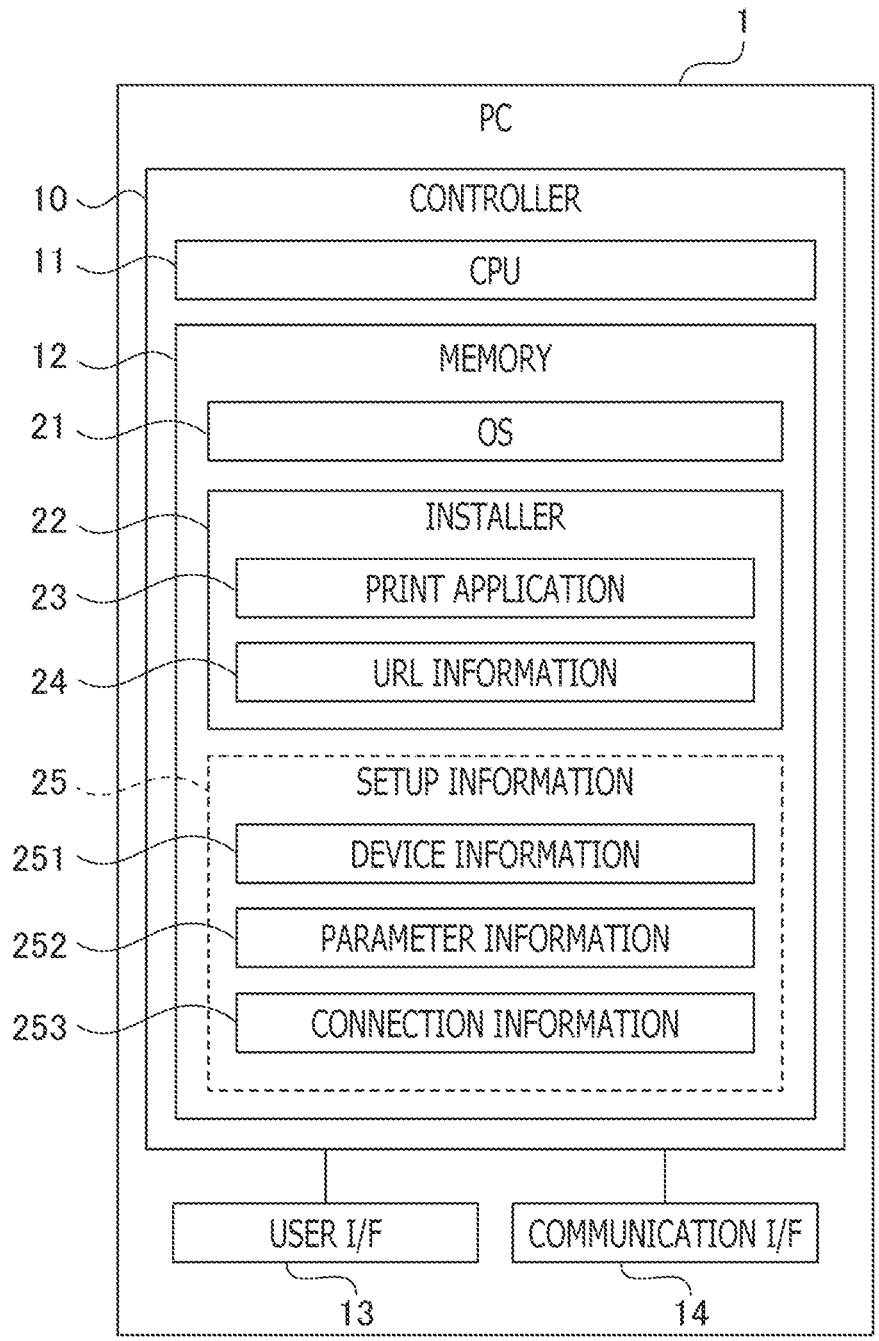
FIG. 2 is a block diagram showing an electrical configuration of the PC according to one or more aspects of the present disclosure.

FIG. 2 is a block diagram showing an electrical configuration of the PC 1. The PC 1 of the illustrative embodiment is configured to execute various application programs (hereinafter referred to as "applications"). The PC 1 includes a controller 10 including a CPU 11 and a memory 12. The PC 1 further includes a user I/F ("I/F" is an abbreviation for "interface") 13 and a communication I/F 14, which are electrically connected with the controller 10.

Figure 3:
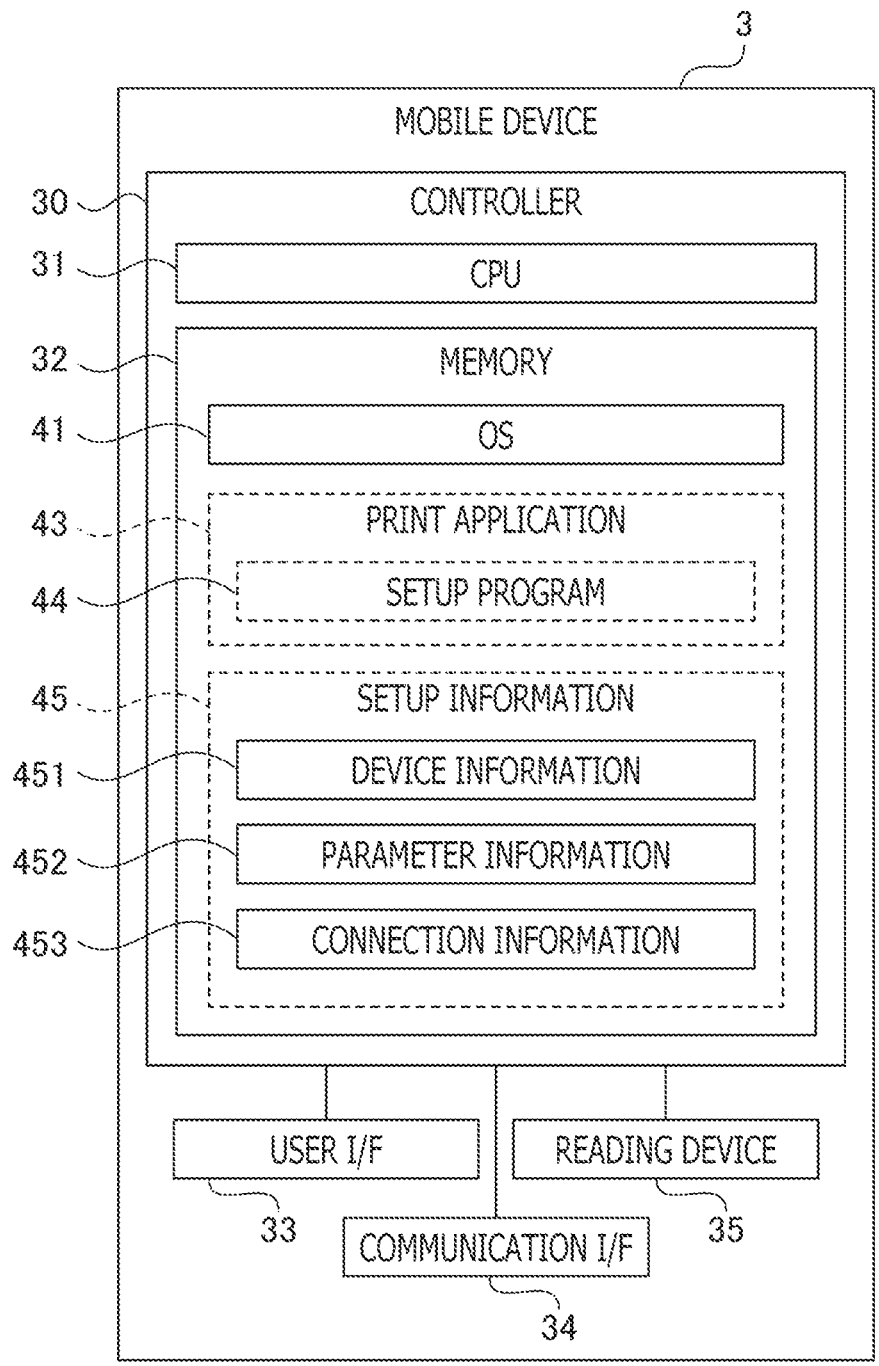
FIG. 3 is a block diagram showing an electrical configuration of the mobile device according to one or more aspects of the present disclosure.

FIG. 3 is a block diagram showing an electrical configuration of the mobile device 3. The mobile device 3 of the illustrative embodiment is configured to execute various applications. The mobile device 3 includes a controller 30 including a CPU 31 and a memory 32. The mobile device 3 further includes a user I/F 33, a communication I/F 34, and a reading device 35, which are electrically connected with the controller 30.

The controllers 10 and 30 shown in FIGS. 2 and 3 are generic terms for hardware and software used to control the PC 1 and the mobile device 3. Thus, each of the controllers 10 and 30 may not necessarily represent a single hardware element that actually exists in the PC 1 or the mobile device 3.

Each of the CPUs 11 and 31 shown in FIGS. 2 and 3 is configured to, based on user operations, perform various processes in accordance with programs read from a corresponding one of the memories 12 and 32. Each of the memories 12 and 32 may include at least one of storage devices such as a ROM, a RAM, an HDD, and a flash memory. Each of the memories 12 and 32 has one or more storage areas to store various types of data and various programs such as a startup program for starting the PC 1 or the mobile device 3. The memory 12 and 32 are also used as work areas when various processes are performed. Examples of "memories" according to aspects of the present disclosure may include, but are not limited to, buffers of the CPUs 11 and 31, as well as the aforementioned storage devices.

The examples of the "memories" according to aspects of the present disclosure may include, but are not limited to, non-transitory computer-readable storage media that are readable and writable by the CPUs 11 and 31. Examples of the non-transitory computer-readable storage media may include, but are not limited to, recording media such as CD-ROMs, DVD-ROMs, and USB memories as well as the aforementioned various types of storages. The non-transitory computer-readable storage media are also tangible media. On the other hand, an electrical signal carrying a program downloaded, e.g., from a server on the Internet, is a computer-readable signal medium, but is not included in the examples of the non-transitory computer-readable storage media.

Each of the user I/Fs 13 and 33 includes a hardware element to display information on a screen and a hardware element to accept input operations by the user. Each of the user I/Fs 13 and 33 may include at least one of user interface devices such as a display, a keyboard, and a mouse. Each of the user I/Fs 13 and 33 may include a touch panel having a display function and an input acceptance function.

The communication I/F 14 shown in FIG. 2 includes hardware for communication with external devices such as the MFP 5 and a server 7. A communication method for the communication I/F 14 may be wired or wireless. The communication method for the communication I/F 14 may be compliant with any of communication standards such as Ethernet ("Ethernet" is a registered trademark of Fuji Xerox Co., Ltd.), Wi-Fi ("Wi-Fi" is a registered trademark of the non-profit Wi-Fi Alliance), and LAN. The communication I/F 34 shown in FIG. 3 may be compatible with a plurality of communication methods such as 4G and 5G communication methods and wireless communication methods such as Wi-Fi. The reading device 35 may include a small camera incorporated in the mobile device 3. The reading device 35 is configured to read images including characters and images including two-dimensional barcodes.

As shown in FIG. 2, an operating system (hereinafter referred to as an "OS") 21 and an installer 22 are incorporated in the memory 12 of the PC 1. Examples of the OS 21 may include, but are not limited to, Windows ("Windows" is a registered trademark of Microsoft Corp.), macOS ("macOS" is a registered trademark of Apple Inc.), Linux ("Linux" is a registered trademark of Linus Torvalds), Chrome OS ("Chrome OS" is a registered trademark of Google LLC), and UOS ("UOS" is a registered trademark of Uniontech Software Technology Co., Ltd.). The installer 22 is a program provided by, for instance, a vendor of the MFP 5. The installer 22 may be stored in the PC 1 before or after shipment of the MFP 5. The installer 22 is for incorporating the print application 23 into the PC 1. Namely, the installer 22 is configured to, when executed, install the print application 23 into the PC 1 and set up the print application 23 installed.

The installer 22 stores URL information 24. The URL information 24 contains information indicating a URL of a web page that represents a site as a supply source for each program that is compatible with an image processing apparatus (e.g., the MFP 5 in the illustrative embodiment) and is installable in a mobile device (e.g., the mobile device 3 in the illustrative embodiment). For instance, the URL information 24 stores a URL of a web page that represents a site as a supply source for the print application 43 compatible with the mobile device 3.

The installer 22 has a function to generate and display QR code images ("QR Code" is a registered trademark of DENSO WAVE INCORPORATED). Specifically, the installer 22 is configured to generate access information based on a URL stored in the URL information 24, and cause the user I/F 13 of the PC 1 to display a first QR code image representing the generated access information. The access information is generated in a language analyzable by the server 7. Further, the installer 22 is configured to obtain setting information from a device (e.g., the MFP 5 in the illustrative embodiment) in an installation process (e.g., a below-mentioned installation process shown in FIG. 4) to install a program (e.g., the print application 23) into the PC 1, generate a second QR code image representing the obtained setting information, and display the generated second QR code image on the user I/F 13 of the PC 1.

FIG. 2 shows a state of the PC 1 after the installer 22 is incorporated into the PC 1 and before installation of the print application 23 is performed by the installer 22. After the installation of the print application 23 is performed by the installer 22, the print application 23 may be incorporated into the PC 1, and the installer 22 may be deleted.

As shown in FIG. 3, an OS 41 is incorporated in the memory 32 of the mobile device 3. Examples of the OS 41 may include, but are not limited to, iOS ("iOS" is a registered trademark of Cisco Systems, Inc.), Android ("Android" is a registered trademark of Google LLC), and HarmonyOS ("HarmonyOS" is a registered trademark of Huawei Technologies Co., Ltd.). The OS 41 has its own installation program for incorporating applications into the memory 32. The mobile device 3 may install the print application 43 using the installation program of the OS 41. In FIG. 3, elements each surrounded by a dashed line represent that the elements have not been installed in the mobile device 3. Namely, FIG. 3 shows a state of the mobile device 3 in which installation of the print application 43 has not been completed.

The PC 1 shown in FIG. 2 and the mobile device 3 shown in FIG. 3 have different corresponding platforms. For instance, the differences between their corresponding platforms may include a difference in the type of software for setting up their respective print applications 23 and 43. The differences between their corresponding platforms may include a difference in the OS for each of the destination terminals in which their respective print applications 23 and 43 are set up. The differences between their corresponding platforms may include a difference in whether the software for setting up their respective print applications 23 and 43 is provided by the vendor of the image processing apparatus (e.g., the MFP 5 in the illustrative embodiment). Specifically, in the illustrative embodiment, the types of the OSs 21 and 41 are different between the PC 1 and the mobile device 3. Further, it is different, between the PC 1 and the mobile device 3, whether installation of the print applications 23 and 43 by the installer provided by the vendor of the MFP 5 is possible. Further, programs for setting up the print applications 23 and 43 are different between the PC 1 and the mobile device 3. Namely, in the PC 1, the installer 22 performs installing and setting up the print application 23. Meanwhile, in the mobile device 3, the print application 43 is installed by a service (e.g., App Store or Google Play) provided by a service provider other than the vendor of the MFP 5, and is set up by the print application 43 itself. It is noted that "App Store" is a registered trademark of Apple Inc., and "Google Play" is a registered trademark of Google LLC.

The print applications 23 and 43 are programs having functions to control the MFP 5, such as a function to generate print data for causing the MFP 5 to perform printing, and a function to configure settings for the printing. Setup information 25 and setup information 45, which are indicated by the dashed lines in FIGS. 2 and 3, are stored in the memories 12 and 32 when the print applications 23 and 43 are set up, respectively. For instance, the setup information 25 and the setup information 45 may be newly generated and stored when the print applications 23 and 43 are set up, respectively. In another instance, if default information, or setup information used by an application used in the past is available, such information may be updated and stored as the setup information 25 and 45. The setup information 25 and the setup information 45 are referred to by the print applications 23 and 43 to use the MFP 5, respectively. The setup information 25 includes device information 251, parameter information 252, and connection information 253. The setup information 45 includes device information 451, parameter information 452, and connection information 453.

Each of the device information 251 and 451 is information regarding a device (e.g., the MFP 5 in the illustrative embodiment) selected in an installation process to install the corresponding print application 23 or 43. Each device information includes a device name of the selected device, and specific information (e.g., an IP address or a MAC address) that specifies the selected device. Each of the parameter information 252 and 452 is information that indicates various functions and settings of the selected device. Each of the connection information 253 and 453 is information used for network connection.

The server 7 shown in FIG. 1 is, for instance, a storage provided on the Internet 9. The server 7 stores web page information. For instance, the web page information stored in the server 7 contains information on a web page representing a site as a supply source for the print application 43 that is compatible with the MFP 5 and the mobile device 3. The sites represented by the web page information stored in the server 7 may include, but are not limited to, web pages for download provided by the vendor of the MFP 5, and sites of services (e.g., App Store and Google Play) recommended by other than the vendor of the MFP 5. The web page representing a site for download provided by the vendor of the image processing apparatus may be provided for each model of image processing apparatus. For instance, each of the installer 22 and the print application 43 may be downloaded into a corresponding one of the PC 1 and the mobile device 3 via a web page provided by the server 7. In another instance, the installer 22 may be provided via a storage medium such as a CD or a DVD.

Next, procedures to install programs into the PC 1 and the mobile device 3 will be described. Each processing step in the following processes and flowcharts basically indicates a process by a corresponding CPU in accordance with instructions described in a program. A process of determination by a CPU may be described conceptually as "it is determined whether it is Matter B from Information A." Namely, each of processes such as "determining," "judging," "obtaining," and "acquiring" in the following description may represent a process by a corresponding CPU. The processes by the CPUs may include hardware control using an API of the OS 21 of the PC 1 or an API of the OS 41 of the mobile device 3. In the present disclosure, operations according to each program may be described without any mention of the OSs 21 and 41.

It is noted that "obtaining" or "acquiring" may be used as a concept that does not necessarily require a request. Further, "data" in the present disclosure may be expressed in a computer-readable bit sequence. Additionally, a plurality of pieces of data having substantially the same meaning or content but expressed in different formats shall be treated as the same data. The same may apply to "information" in the present disclosure. "Requesting" and "instructing" are concepts that represent to output information indicating what is requested and what is instructed to the other party. Further, the information indicating what is requested and what is instructed may be referred to simply as "request" and "instruction."

Figure 4A:
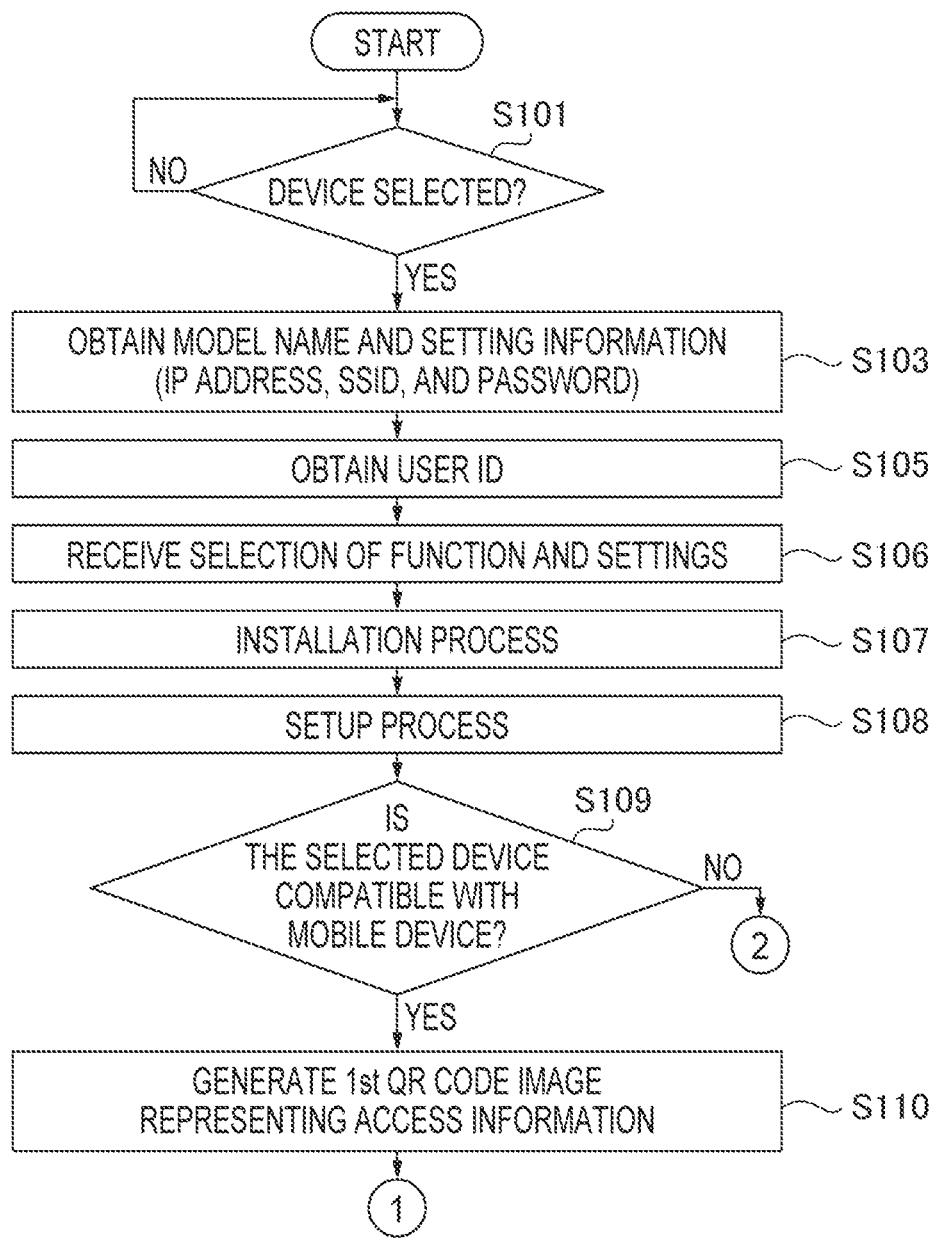
FIGS. 4A and 4B are flowcharts showing a procedure of an installation process to be performed by the PC, according to one or more aspects of the present disclosure.
Figure 4B:
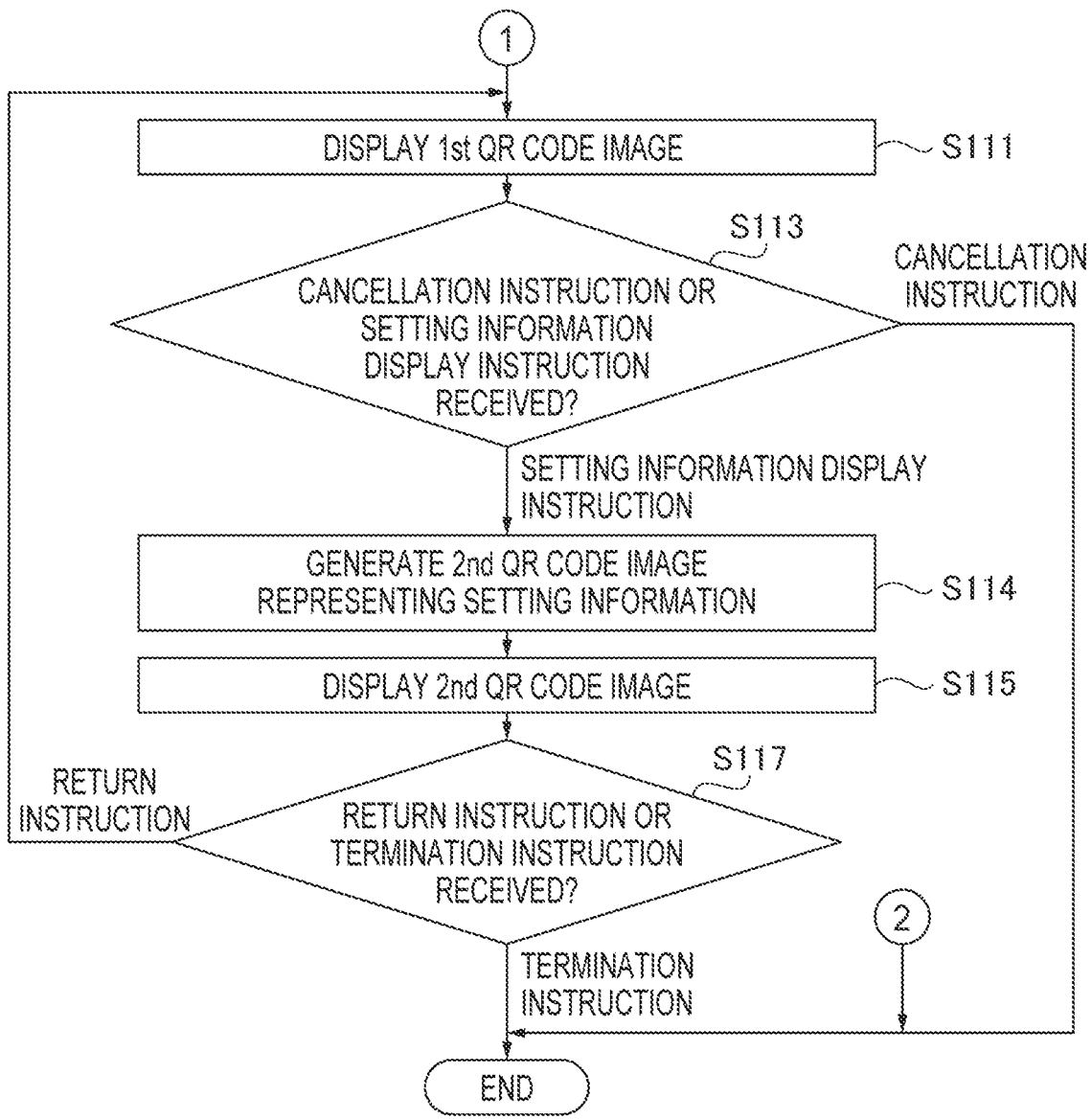

First, a procedure for installing and setting up a program on the PC 1 will be described. FIG. 4 is a flowchart showing a procedure of an installation process. The following description is provided based on an assumption that the print application 23 compatible with the platform of the PC 1 is installed and set up on the PC 1. When the PC 1 receives an installation instruction to install the print application 23 via the user I/F 13, the CPU 11 activates the installer 22, thereby performing the installation process shown in FIG. 4.

The CPU 11 determines whether a device has been selected (S101). Specifically, for instance, the CPU 11 searches for one or more devices via a communication system with the access point 8, causes the user I/F 13 to display the one or more devices found by the search, and receives a selection from among the one or more devices displayed on the user I/F 13.

For instance, when a plurality of devices including the MFP 5 are connected with the PC 1, the CPU 11 finds the plurality of devices, and displays the found devices on the user I/F 13 in a user-selectable manner. The CPU 11 accepts selection of the MFP 5 from among the plurality of devices via the user I/F 13. Further, for instance, if the MFP 5 is the only device connected with the PC 1, the CPU 11 accepts selection of the MFP 5. Thus, when the MFP 5 has been selected, the CPU 11 obtains, from the selected MFP 5, a model name and the setting information of the MFP 5 via the communication I/F 14 (S103). Specifically, for instance, the CPU 11 obtains the IP address of the MFP 5, and the SSID and the password of the access point 8 as set in the MFP 5, from the MFP 5.

When the PC 1 is connected with the MFP 5 via the access point 8, as in the illustrative embodiment, the SSID and the password of the access point 8 are set in the OS 21 of the PC 1. In such a case, in S103, the CPU 11 may obtain the SSID and the password of the access point 8 from the OS 21, without having to obtain them from the MFP 5.

The CPU 11 obtains a user ID (S105). The user ID is information used for user authentication for the PC 1. Specifically, for instance, the CPU 11 may obtain the user ID registered in the PC 1. If the user ID of the user who is authorized to use the MFP 5 is registered in the MFP 5, the CPU 11 may obtain the user ID from the MFP 5 in S103. In the present disclosure, the user ID may be information contained in the setting information.

The CPU 11 receives, via the user I/F 13, selection of a function to be installed and selection of default settings to be used for execution of the selected function (S106). In S106, the CPU 11 receives the selection of the function to be installed from among functions supported by the model of the MFP 5. For instance, the functions may include, but are not limited to, a fax function, a printing function, and a scanning function. For instance, settings for the printing function include a plurality of items such as a sheet type, a sheet size, designation of a tray, and designation of simplex/duplex printing. Each of the settings may be selected from among a plurality of options for each item.

The CPU 11 installs a program into the PC 1 based on the selections received in S106 (S107). Specifically, for instance, the CPU 11 installs and incorporates the print application 23 into the PC 1. The installer 22 may install a program for executing an ancillary function associated with at least one of the functions of the MFP 5. Examples of the ancillary function may include, but are not limited to, a CD label printing function for editing and printing CD labels, and a postcard printing function for automatically lay out the location of an address to be printed on a postcard.

Then, the CPU 11 sets up the installed program and stores the setup information 25 in the memory 12 (S108). The setup information 25 includes the device information 251 on the device selected in S101, the parameter information 252 regarding the function and the settings selected in S106, and the connection information 253 used for network connection. The device information 251 includes the IP address of the MFP 5 obtained from the MFP 5 in S103. Further, the connection information 253 includes the SSID and the password obtained in S103.

In such a system as in the illustrative embodiment, a single user may own both the PC 1 and the mobile device 3, and may use the MFP 5 from both the PC 1 and the mobile device 3. In this case, the single user may set up the mobile device 3 following the setup of the PC 1. The mobile device 3 has a platform different from the platform of the PC 1. Therefore, in order for the mobile device 3 to perform the same function as the PC 1, a program compatible with the mobile device 3 needs to be installed into the mobile device 3. Hence, the CPU 11 makes preparations for installation of the program compatible with the mobile device 3 into the mobile device 3 (S109-S115), following the installation of the program compatible with the PC 1 into the PC 1.

For instance, the mobile device 3 may not use a printer driver and may output print jobs by an OS-based printing system (e.g., Air Print), and some image processing apparatuses may not be compatible with such a printing system. Therefore, after setting up the print application 23, the CPU 11 determines whether the selected device is compatible with the mobile device 3 (S109).

Specifically, the CPU 11 determines whether the MFP 5 is compatible with the mobile device 3, from the model name obtained from the MFP 5 in S103. The installer 22 stores compatibility information indicating whether each image processing apparatus is compatible with the mobile device 3, in association with the model name of each image processing apparatus. The CPU 11 determines whether the MFP 5 is compatible with the mobile device 3 by checking the model name obtained from the MFP 5 against the compatibility information. The compatibility information may be stored in a server (e.g., the server 7) instead of the installer 22. In this case, the CPU 11 may inquire, of the server, whether the MFP 5 is compatible with the mobile device 3 by using the model name of the MFP 5.

When determining that the selected device is not compatible with the mobile device 3 (S109: No), the CPU 11 terminates the installation process without displaying the QR code images on the user I/F 13. Thus, the PC 1 does not display the access information or the setting information with respect to the device incompatible with the mobile device 3. Hence, the mobile device 3 is allowed to avoid a useless operation of reading the access information and installing the print application 43.

Meanwhile, when determining that the selected device is compatible with the mobile device 3 (S109: Yes), the CPU 11 performs processes to cause the user I/F 13 of the PC 1 to display the access information and the setting information (S110-S115).

First, the CPU 11 generates the first QR code image representing the access information (S110). For instance, the CPU 11 extracts from the URL information 24 a URL of a web page representing a site as a supply source of the print application 43 that is compatible with the MFP 5 selected in S101 and with the platform of the mobile device 3. Then, the CPU 11 generates the access information based on the extracted URL. For instance, if the installer 22 stores query parameters indicating functions and settings, the CPU 11 may extract query parameters corresponding to the function and the settings as selected in S106 and may add the extracted query parameters to the end of the URL. The CPU 11 encodes the generated access information, thereby generating the first QR code image. The CPU 11 stores the generated first QR code image in the memory 12 until termination of the installation process shown in FIG. 4.

Figure 5:
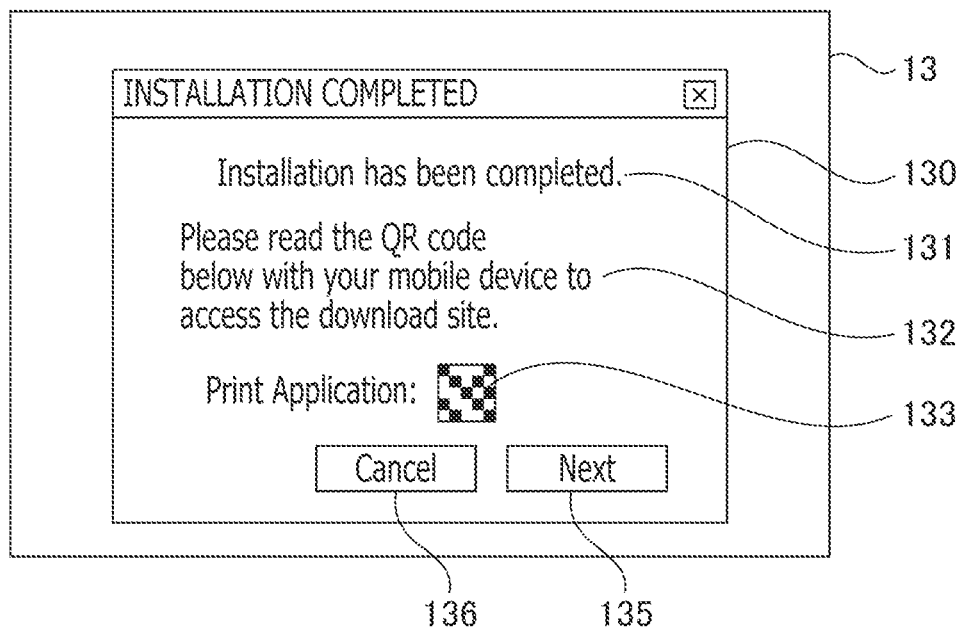
FIG. 5 shows an example of a first display screen displayed on the PC, according to one or more aspects of the present disclosure.

The CPU 11 causes the user I/F 13 to display the first QR code image generated in S110 (S111). FIG. 5 shows an example of a first display screen 130 displayed on the PC 1. The first display screen 130 displays thereon the first QR code image 133 representing the access information, a completion message 131 for notifying the user that the installation has been completed, and a read message 132 for prompting the user to read the first QR code image 133. Further, the first display screen 130 displays thereon a "Cancel" button 136 for receiving a cancellation instruction to cancel the installation process and a "Next" button 135 for providing an instruction to proceed to a next process. For instance, if the CPU 11 installs a program for an ancillary function in addition to the print application 23 in S107, the CPU 11 may generate the access information for each program and display the first QR code image for each access information on the user I/F 13.

As shown in FIG. 4, the CPU 11, which has caused the user I/F 13 to display the first display screen 130 in S111, determines whether a cancellation instruction or a setting information display instruction has been received (S113). When the "Cancel" button 136 is operated via the user I/F 13, the CPU 11 receives a cancellation instruction (S113: Cancellation Instruction) and terminates the installation process without displaying the second QR code image representing the setting information on the user I/F 13.

When the "Next" button 135 is operated via the user I/F 13, the CPU 11 determines that a setting information display instruction to display the setting information has been received (S113: Setting Information Display Instruction), and generates the second QR code image representing the setting information (S114). Specifically, the CPU 11 encodes the setting information that contains the IP address, the SSID, and the password as obtained from the MFP 5 in S103, and the user ID obtained in S105, thereby generating the second QR code image.

Figure 6:
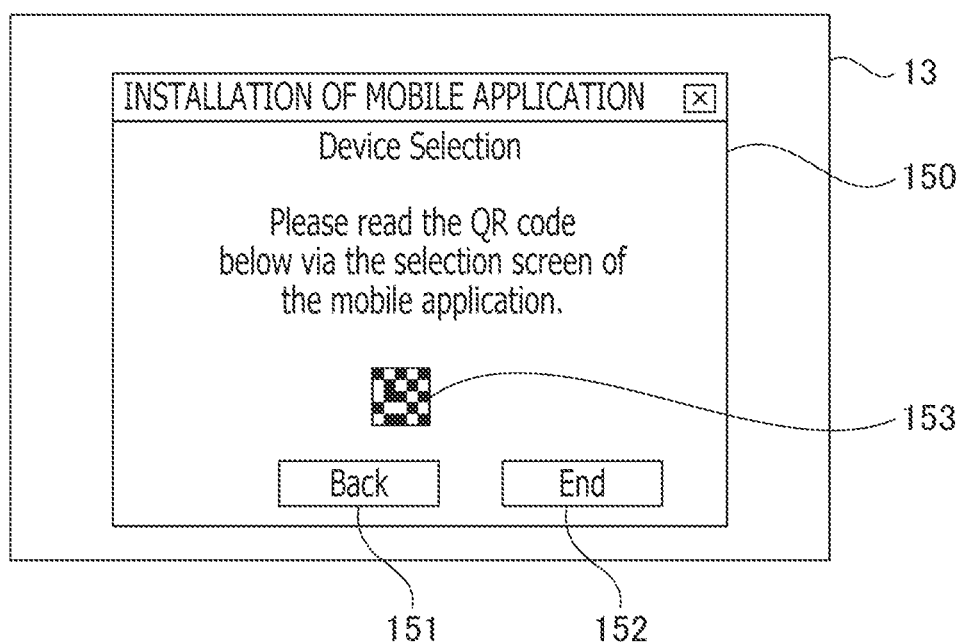
FIG. 6 shows an example of a second display screen displayed on the PC, according to one or more aspects of the present disclosure.

Then, the CPU 11 causes the user I/F 13 to display the second QR code image generated in S114 (S115). FIG. 6 shows an example of a second display screen 150 displayed on the PC 1. The second display screen 150 displays thereon the second QR code image 153 generated in S114, a "Back" button 151, and an "End" button 152.

As shown in FIG. 4, the CPU 11, which has caused the user I/F 13 to display the second display screen 150 in S115, determines whether a return instruction or a termination instruction has been received (S117). When the "Back" button 151 is operated via the user I/F 13, the CPU 11 determines that a return instruction has been received (S117: Return Instruction). In this case, the CPU 11 goes back to S111 and causes the user I/F 13 to re-display the first QR code image 133 stored in the memory 112. Namely, the CPU 11 switches the second display screen 150 to the first display screen 130. Thereby, the PC 1 may re-display the first QR code image 133 in accordance with the user's intention. Hence, even when the setting information display instruction is received in response to the "Next" button 135 being operated in a state where the mobile device 3 has not read or has failed to read the first QR code image 133, it is possible to cause the mobile device 3 to read the first QR code image 133. In addition, the PC 1 re-displays the first QR code image 133 stored in the memory 12. Accordingly, since there is no need to repeatedly generate the access information with the same contents, it is possible to reduce a processing load on the PC 1.

The installer 22 (more exactly, the CPU 11 executing the installer 22) may store the second QR code image 153 in the memory 12 until termination of the installation process shown in FIG. 4. In this case, for instance, when the "Next" button 135 is operated via the user I/F 13 after the first QR code image 133 is re-displayed, the installer 22 may skip S114 and re-display the second QR code image 153 stored in the memory 12. Thereby, it is possible to avoid repeated generation of the same setting information and reduce the processing load on the PC 1.

When the "End" button 152 is operated via the user I/F 13, the CPU 11 determines that the termination instruction has been received (S117: Termination Instruction). In this case, the CPU 11 terminates the installation process shown in FIG. 4. Thereby, the installer 22 may terminate the display of the second QR code image 153 in accordance with the user's intention.

Next, a process to install a program into the mobile device 3 will be described. The mobile device 3 activates the reading device 35 to read the first QR code image 133 (see FIG. 5) displayed on the user I/F 13 of the PC 1 by the installer 22.

The mobile device 3 decodes the first QR code image 133 and accesses the server 7 based on the URL represented by the first QR code image 133 through the 4G communication line or the 5G communication line via the communication IF 34, or through an access point currently connected using Wi-Fi wireless communication via the communication I/F 34. The server 7 provides the mobile device 3 with a web page based on the URL. The mobile device 3 displays the web page provided by the server 7 on the user I/F 33.

Figure 7:
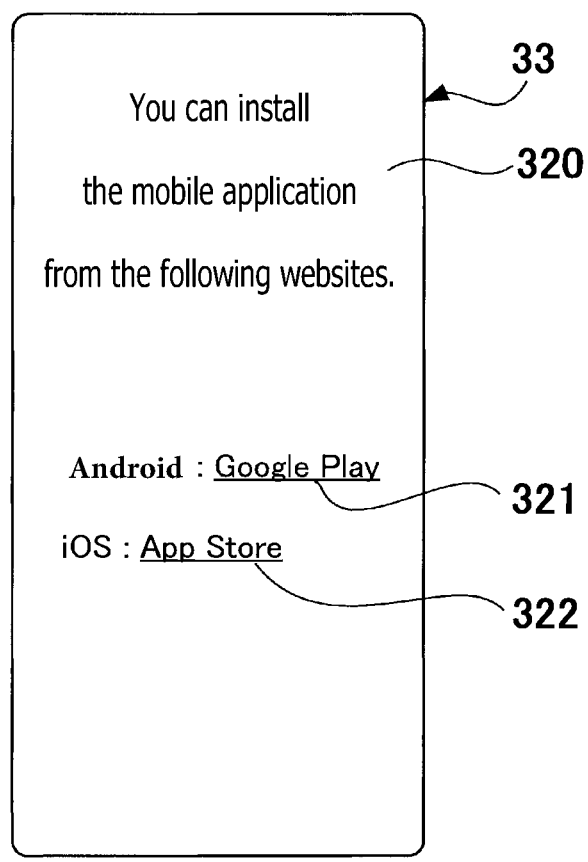
FIG. 7 shows an example of a webpage displayed on the mobile device, according to one or more aspects of the present disclosure.

FIG. 7 shows an example of a web page 320 displayed on the mobile device 3. The web page 320 is for installing the print application 43 compatible with the mobile device 3. The web page 320 includes links 321 and 322 attached. Each of the links 321 and 322 is associated with a corresponding type of OS for the mobile device 3. Specifically, for instance, the link 321 is for Android, and the link 322 is for iOS. Each link may be associated with a web page representing a site for download provided by the vendor of the MFP 5.

For instance, when the link 321 is operated via the user I/F 33, the mobile device 3 accesses the site of Google Play, and starts installing the Android-compatible print application 43 in response to an instruction to install the print application 43 from the site. At this time, the mobile device 3 installs the print application 43 using the OS 41. Thus, since the web page 320 displayed on the mobile device 3 includes the links 321 and 322 for installing the program, the mobile device 3 is allowed to easily install the program compatible with the platform of the mobile device 3.

Figure 8A:
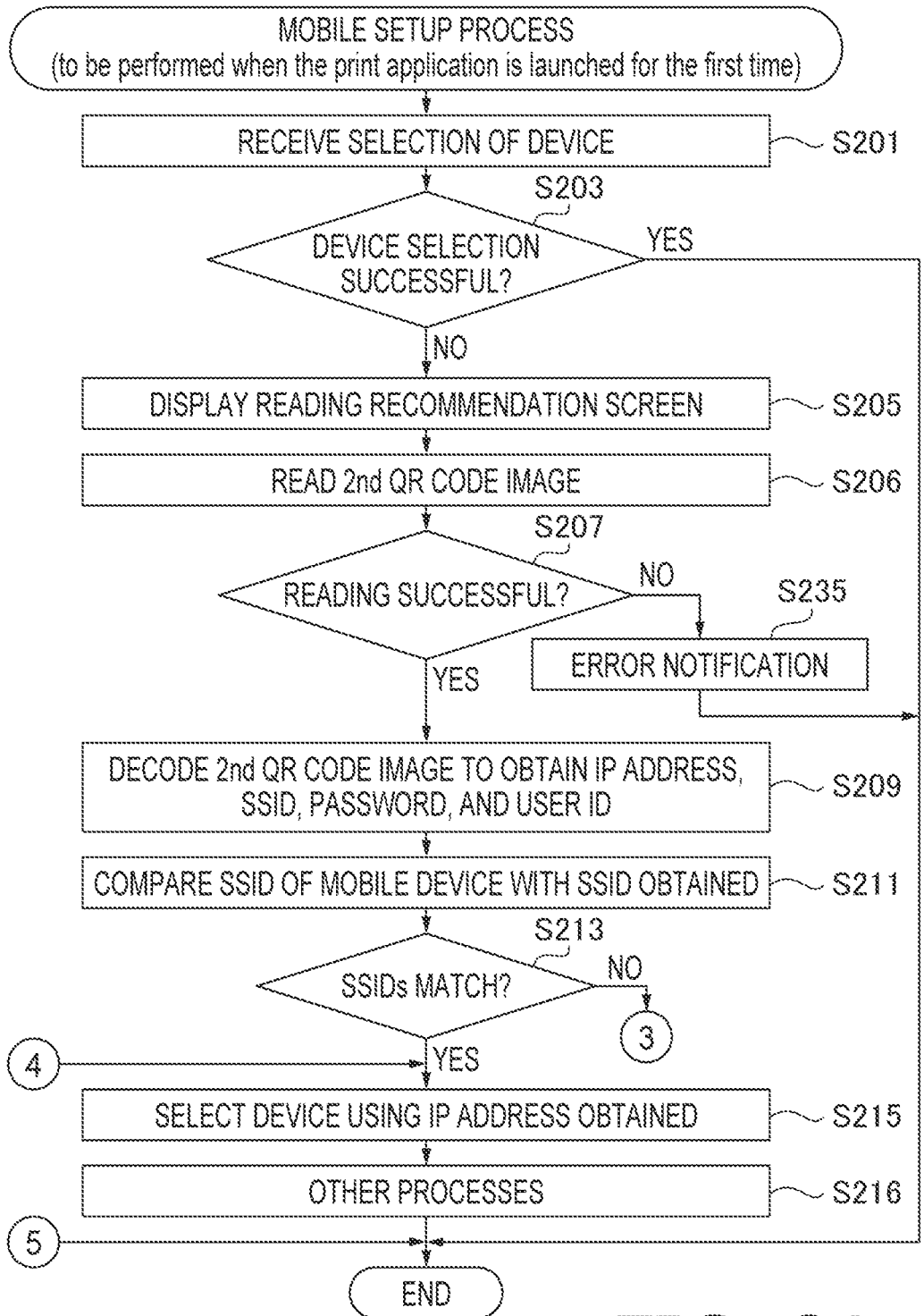
FIGS. 8A and 8B are flowcharts showing a procedure of a mobile setup process to be performed by the mobile device, according to one or more aspects of the present disclosure.
Figure 8B:
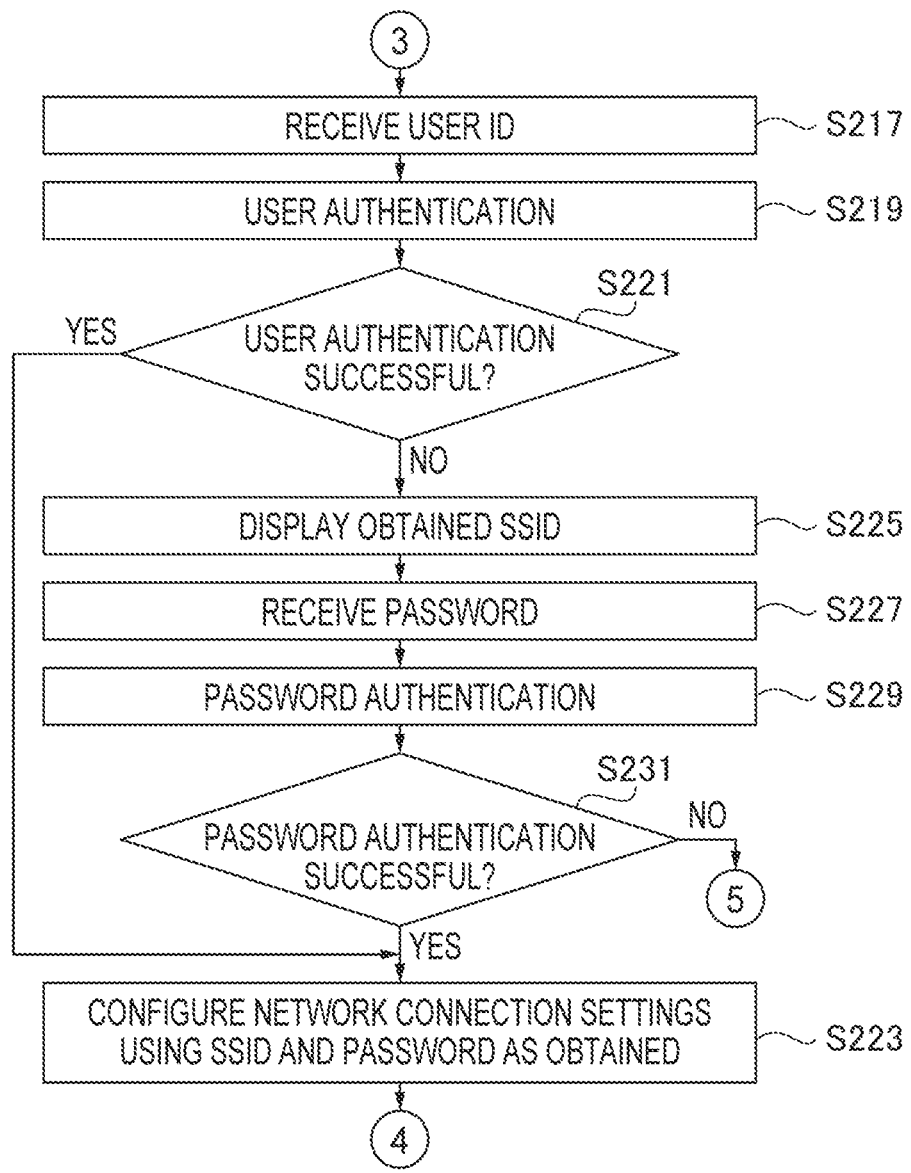

Next, a mobile setup process to set up the program installed in the mobile device 3 will be described. FIGS. 8A and 8B are flowcharts showing a procedure of the mobile setup process. The following description will be provided based on an assumption that the print application 43 is to be set up on the mobile device 3 in the mobile setup process. Further, it is assumed that the user desires to connect the mobile device 3 to the MFP 5 via the access point 8. When the mobile device 3 launches the print application 43 installed using the OS 41 for the first time, the CPU 31 activates a setup program 44 of the print application 43 and performs the mobile setup process shown in FIGS. 8A and 8B. The mobile setup process may be performed in response to receipt of an instruction to set up the print application 43 via the user I/F 33.

The CPU 31 receives selection of a device (S201). Specifically, for instance, the CPU 31 connects the mobile device 3 with the network via the communication I/F 34 using the connection information 453 stored in the memory 32 of the mobile device 3, and searches for devices on the network. The CPU 31 causes the user I/F 33 to display devices found through the search, and prompts the user to select one of the devices via the user I/F 33. Then, the CPU 31 determines whether a user-intended device has been selected (S203).

For instance, when the mobile device 3 has already been connected with the access point 8, and only the MFP 5 is found through the search, the CPU 31 determines that the device selection was successful (S203: Yes). In this case, the CPU 31 terminates the mobile setup process.

Meanwhile, when the CPU 31 did not succeed in selecting the user-intended device (e.g., the MFP 5 in the illustrative embodiment) (S203: No), the CPU 31 displays a reading recommendation screen 340 (see FIG. 9) on the user I/F 33 (S205). For instance, if the mobile device 3 is not connected with any access point, no device will be found through the search. Further, if the mobile device 3 is connected with a different access point from the access point 8, the MFP 5 will not be included in the devices found through the search. In such cases, the CPU 31 determines in S203 that the device selection was not successful (S203: No), and then causes the user I/F 33 to display the reading recommendation screen 340 shown in FIG. 9 (S205).

Figure 9:
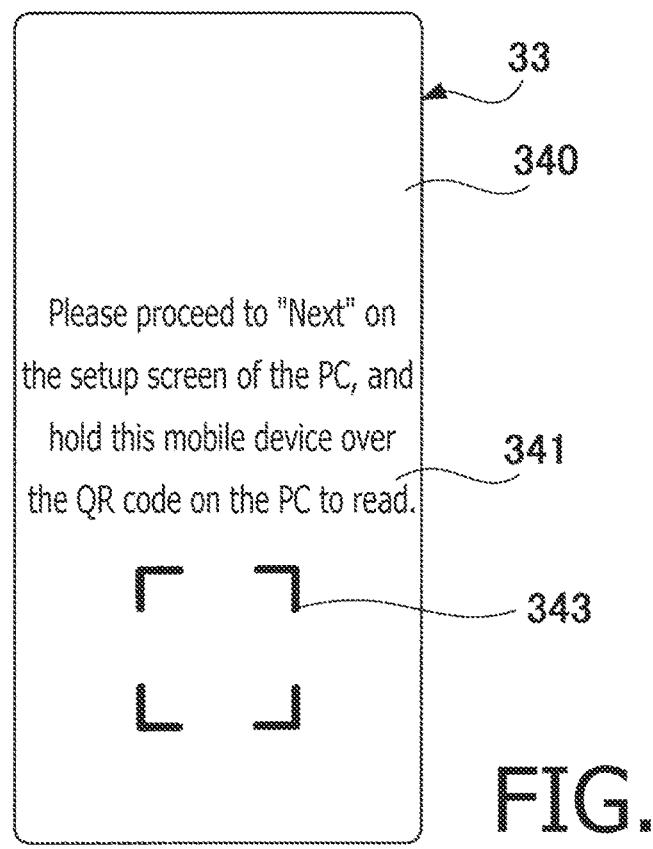
FIG. 9 shows an example of a reading recommendation screen displayed on the mobile device, according to one or more aspects of the present disclosure.

The reading recommendation screen 340 shown in FIG. 9 displays thereon a message 341 and a QR code reading frame 343. The message 341 provides a notification for prompting the user to cause the PC 1 to display the setting information and cause the mobile device 3 to read the setting information to be displayed on the PC 1. The user who has seen the message 341 operates the "Next" button 135 (see FIG. 5) displayed on the user I/F 13 of the PC 1. Thereby, the PC 1 switches the first display screen 130 shown in FIG. 5 to the second display screen 150 shown in FIG. 6, and displays the second QR code image 153 representing the setting information on the user I/F 13.

As shown in FIG. 8A, the CPU 31 reads the second QR code image 153 using the reading device 35 (S206), and determines whether the reading was successful (S207). For instance, when the read second QR code 153 is unable to be analyzed, or information obtained after the analysis of the read second QR code 153 is not appropriate, the CPU 31 determines that the reading of the second QR code image 153 was not successful (S207: No). In this case, the CPU 31 provides an error notification of the unsuccessful reading (S235), and terminates the mobile setup process.

Meanwhile, when determining that the reading of the second QR code image 153 was successful (S207: Yes), the CPU 31 decodes the read second QR code image 153 and obtains the IP address, the SSID, the password, and the user ID as represented by the second QR code image 153 (S209).

The CPU 31 compares the SSID set in the connection information 453 stored in the memory 32 of the mobile device 3 with the SSID obtained in S209 (S211), and determines whether both the SSIDs match (S213). For instance, when the mobile device 3 is connected with the access point 8 in the same manner as the MFP 5 is, or has been connected before but is not currently connected with the access point 8, the SSID set in the connection information 453 stored in the memory 32 matches the SSID obtained from the second QR code image 153 (S213: Yes). In this case, the CPU 31 selects a device using the IP address of the MFP 5 obtained in S209 (S215). Namely, the CPU 31 selects the MFP 5 as a target device to be controlled by the print application 43, without changing the SSID and the password set in the connection information 453 stored in the memory 32. Specifically, the CPU 31 sets the IP address of the MFP 5 obtained in S209 in the device information 451.

Thereafter, the CPU 31 performs other processes necessary for setting up the print application 43 on the mobile device 3, such as setting the parameter information 452 (S216). Afterward, the CPU 31 terminates the mobile setup process. Thus, the mobile device 3 is enabled to configure network connection settings and select the device by simply reading the second QR code image 153 using the reading device 35. Therefore, it is possible to reduce time and effort required for the user to input information when setting up the print application 43 on the mobile device 3.

Meanwhile, for instance, when the mobile device 3 has never been connected with the access point 8 connected with the MFP 5, or when the mobile device 3 is unable to find a network connectable with the mobile device 3, the CPU 31 determines that the SSID set in the connection information 453 stored in the memory 32 does not match the SSID obtained in S209 (S213: No).

Figure 10:
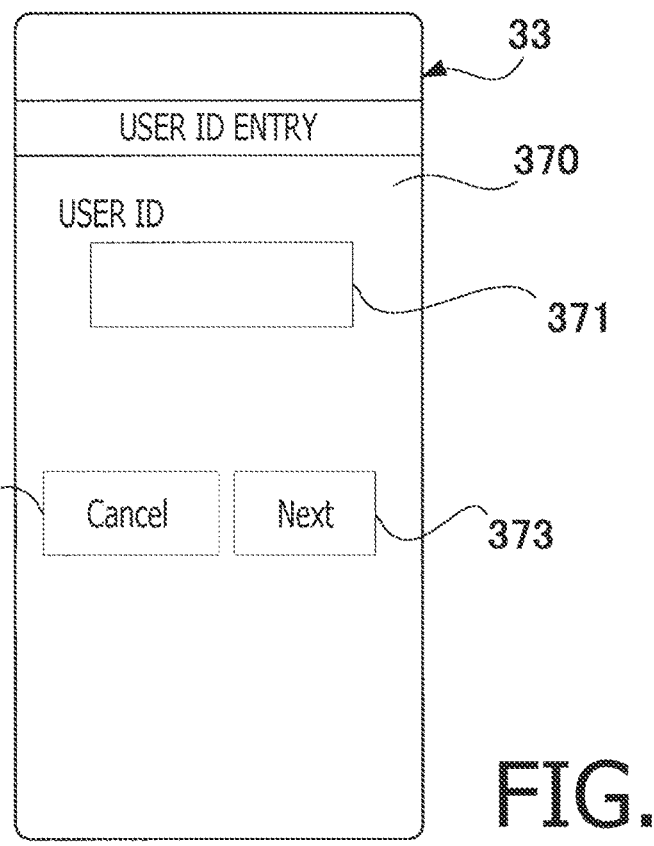
FIG. 10 shows an example of a user ID entry screen displayed on the mobile device, according to one or more aspects of the present disclosure.

In this case, the CPU 31 receives a user ID (S217). Specifically, for instance, the CPU 31 displays a user ID entry screen 370 (see FIG. 10) on the user I/F 33. The user ID entry screen 370 displays thereon a user ID entry field 371, a "Cancel" button 372, and an "Authentication" button 373. The user ID entry field 371 is configured to receive an input of a user ID. For instance, when receiving an operation of the "Authentication" button 373 via the user I/F 33, the CPU 31 receives, as the user ID, a character string input in the user ID entry field 371.

As shown in FIG. 8B, the CPU 31 performs user authentication based on the user ID received in S217 (S219). Specifically, the CPU 31 performs the user authentication by comparing the user ID received in S217 with the user ID obtained in S209.

When the user ID received in S217 matches the user ID obtained in S209, the CPU 31 determines that the user authentication was successful (S221: Yes). In this case, the user of the mobile device 3 is considered to be the same as the user who is authorized to use the PC 1. Therefore, it is unlikely that security will be damaged even if the SSID obtained from the second QR code image 153 is used to connect the mobile device 3 with the network. Therefore, the CPU 31 configures network connection settings using the SSID and the password obtained in S209 (S223). Namely, the CPU 31 changes existing connection information (e.g., in the illustrative embodiment, information contained in the connection information 453) used for network connection, to the SSID and the password obtained in S209. Thereafter, the CPU 31 proceeds to S215. Since the processes of S215 and the following steps have been described above, explanations thereof will be omitted.

When the user ID received in S217 does not match the user ID obtained in S209, the CPU 31 determines that the user authentication was not successful (S221: No). In this case, the user who sets up the print application 43 may be different from the user who is authorized to use the PC 1. Therefore, in order to avoid automatic connection with the network, the CPU 31 displays the SSID obtained in S209 on the user I/F 33 (S225), and makes a request for a password for network connection, to receive an input of the password via the user I/F 33 (S227). Namely, the security is ensured by receiving the input password.

Figure 11:
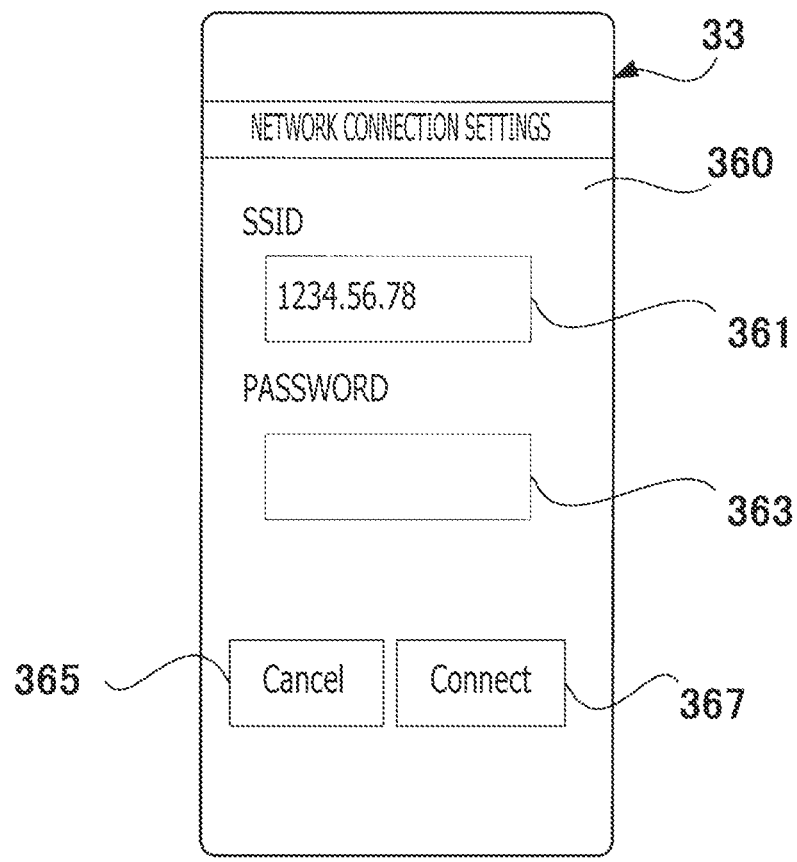
FIG. 11 shows an example of a network connection setting screen displayed on the mobile device, according to one or more aspects of the present disclosure.

Specifically, for instance, the CPU 31 causes the user I/F 33 to display a network connection setting screen 360 shown in FIG. 11. The network connection setting screen 360 displays thereon an SSID display field 361 for displaying the SSID, a password entry field 363 for inputting a password, a "Cancel" button 365, and a "Connect" button 367. In the SSID display field 361, the SSID obtained in S209 is automatically displayed. It is impossible to change what is displayed in the SSID display field 361. This is because even though the mobile device 3 accepts a change of the SSID, a network connected with the mobile device 3 after the SSID has been changed is different from the network connected with the MFP 5, and therefore the mobile device 3 is unable to be connected with the MFP 5. The password entry field 363 is a blank field to receive an input of an arbitrary character string. When the "Connect" button 367 is operated via the user I/F 33 with a password input in the password entry field 363, the CPU 31 receives, as a password, a character string input in the password entry field 363.

Referring back to FIGS. 8A and 8B, the CPU 31 performs password authentication (S229). Specifically, the CPU 31 compares the password input in the password entry field 363 with the password obtained in S209. Then, when both the passwords match, the CPU 31 determines that the password authentication was successful (S231: Yes). Meanwhile, when both the passwords do not match, the CPU 31 determines that the password authentication was not successful (S231: No).

When the password authentication was successful (S231: Yes), the CPU 31 proceeds to S223 since the mobile device 3 is authorized to access the access point 8. Since the processes of S223 and the following steps have been described above, explanations thereof will be omitted.

When the password authentication was not successful (S231: No), the CPU 31 is unable to connect the mobile device 3 with the network connected with the MFP 5. In this case, the CPU 31 terminates the mobile setup process without configuring the network connection settings or selecting any device.

As described above, along with installation of the print application 23, the PC 1, in which the installer 22 of the illustrative embodiment is incorporated, generates the access information based on the URL of the web page representing the site of the supply source for the print application 43 compatible with the platform of the mobile device 3, and causes the user I/F 13 to display the first QR code image 133 representing the generated access information. The mobile device 3 may access the web page representing the site of the supply source for the print application 43 by reading the first QR code image 133 displayed on the user I/F 13 of the PC 1 using the reading device 35. Thereby, it is possible to reduce time and effort required for the user to input information necessary for accessing the site for installing the print application 43. Furthermore, the PC 1 causes the user I/F 13 to display the second QR code image 153 representing the setting information (which contains the IP address, the SSID, the password, and the user ID) obtained from the selected MFP 5. Thereby, the mobile device 3 may obtain the setting information by reading the second QR code image 153 displayed on the user I/F 13 of the PC 1 using the reading device 35, with no need for the user to manually input the setting information. Namely, it is possible to reduce time and effort required for the user to input the setting information for using the image processing apparatus. Thus, according to the installer 22 of the illustrative embodiment, it is possible to save time and effort required for the user to set up the mobile application (e.g., the print application 43) for controlling the MFP 5 on the mobile device 3.

Hereinabove, the illustrative embodiment according to aspects of the present disclosure has been described. Aspects of the present disclosure may be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that aspects of the present disclosure may be practiced without reapportioning to the details specifically set forth. In other instances, well known processing structures have not been described in detail, in order not to unnecessarily obscure the present disclosure.

Only an exemplary illustrative embodiment of the present disclosure and but a few examples of their versatility are shown and described in the present disclosure. It is to be understood that aspects of the present disclosure are capable of use in various other combinations and environments and are capable of changes or modifications within the scope of the inventive concept as expressed herein.

In the aforementioned illustrative embodiment, the MFP 5 has been described as an example of an "image processing apparatus" according to aspects of the present disclosure. However, besides the MFP 5, examples of the "image processing apparatus" according to aspects of the present disclosure may include, but are not limited to, printers for home or office use, image scanners, label printers, industrial printers, 3D printers, fax machines, sewing machines, and machine tools to perform processing according to image data. In other words, besides the print applications 23 and 43, programs to be set up may include, but are not limited to, scanner drivers, fax drivers, sewing instruction programs, embroidery instruction programs, and processing instruction programs. In addition, the number of PCs, the number of mobile devices, the number of MFPs, and the wording of display messages may not necessarily be limited to the examples as shown in the aforementioned illustrative embodiment.

In the aforementioned illustrative embodiment, the mobile device 3 is urged to read the setting information (e.g., the second QR code image 153) when the device selection was unsuccessful. Instead, for instance, the processes of S201 and S203 in FIG. 8A may be omitted. In this case, the mobile device 3 may be urged to read the second QR code image 153 immediately after installation of the print application 43. For instance, the reading recommendation screen 340 may be displayed immediately after the print application 43 is launched for the first time, and the mobile device 3 may be urged to read the second QR code image 153 via the reading recommendation screen 340. Thereby, it is possible to reduce time and effort required for the user to select the device.

In the aforementioned illustrative embodiment, the access information and the setting information are represented by the first QR code image 133 and the second QR code image 153, respectively. However, the access information may be represented by another code image such as a two-dimensional barcode. The respective code images for the access information and the setting information may be in different formats.

Each of the access information and the setting information may be displayed on the user I/F 13 in text (e.g., the URL of a corresponding web page). In this case, the mobile device 3 may read the texts with the reading device 35 and obtain the URLs through text analysis processing such as OCR, thereby accessing the server 7. However, if the access information and the setting information are displayed as code images as exemplified in the aforementioned illustrative embodiment, it makes it easier for the mobile device 3 to read the access information and the setting information since there is no need for the text analysis processing such as OCR. In another instance, one of the access information and the setting information may be displayed in a form of text, and the other may be displayed as a form of code image.

In the aforementioned illustrative embodiment, the setting information is displayed after the access information is displayed. However, the access information and the setting information may be displayed simultaneously. For instance, the access information and the setting information may be displayed in parallel on a single screen. Nonetheless, as described in the aforementioned illustrative embodiment, in the mobile device 3, the setting information is used later than the access information is. In such a case, by the PC 1 displaying the access information and the setting information at respective different timings as in the aforementioned illustrative embodiment, it is possible to separate the display screen for the access information from the display screen for the setting information. Thereby, it is possible to reduce errors in reading the access information and the setting information.

The process of S109 in FIG. 4 may be omitted. However, when the CPU 11 executes S109, and causes the user I/F 13 to not display the access information or the setting information in response to determining that the selected device is incompatible with the mobile device 3, it is possible to prevent the mobile device from performing a useless operation of installing the program (e.g., the print application 43).

The setting information obtained in S103 of FIG. 4 may not contain the specific information such as the IP address or the MAC address. In this case, since the setting information displayed on the PC 1 does not contain the specific information, the mobile device 3 is unable to obtain the specific information even when reading the setting information displayed on the PC 1. However, by the PC 1 obtaining the specific information in S103 of FIG. 4 and displaying the setting information containing the specific information, as in the aforementioned illustrative embodiment, it is possible for the mobile device 3 to easily select the device based on the specific information simply by reading the setting information.

Further, the setting information obtained in S103 of FIG. 4 may not contain the connection information such as the SSID and the password. In this case, since the setting information displayed on the PC 1 does not contain the connection information, the mobile device 3 is unable to obtain the connection information even when reading the setting information displayed on the PC 1. However, by the PC 1 obtaining the connection information in S103 of FIG. 4 and displaying the setting information that contains the connection information, as in the aforementioned illustrative embodiment, it is possible for the mobile device 3 to easily configure the network connection settings based on the connection information simply by reading the setting information. Namely, in this case, it is possible to easily connect the mobile device 3 with the network.

The processes of S109 to S117 in FIG. 4 may be performed by (the CPU 11 executing) the print application 23. Further, some of S109 to S117 may be performed by the print application 23, and the other thereof may be performed by the installer 22. Specifically, for instance, instead of the installer 22 causing the CPU 11 to display the first QR code image 133 and the second QR code image 153, the print application 23 may, when executed, cause the CPU 11 to display the first QR code image 133 and the second QR code image 153 on the user I/F 13 of the PC 1. In this case, the print application 23 may cause the CPU 11 to display the first QR code image 133 or the second QR code image 153 in response to acceptance of a display instruction, or may cause the CPU 11 to always display the first QR code image 133 and the second QR code image 153 while executing the print application 23.

The process of S205 in FIG. 8A may be omitted. Namely, the reading recommendation screen 340, which is for providing the notification that the PC 1 is to be caused to display the setting information and for prompting the user to read the setting information to be displayed on the PC 1, may not be displayed. However, by providing the notification that the setting information is to be displayed on the PC 1, as in the aforementioned illustrative embodiment, it is possible for the user to easily take a next action. The notification that the setting information is to be displayed on the PC 1 may not be provided after the unsuccessful device selection, but may be provided immediately after installation of the print application 43.

The process of S217 to S231 in FIG. 8B may be omitted. In this case, the CPU 31 may terminate the mobile setup process when determining in S213 that the SSIDs do not match (S213: No). However, it is possible to reduce a risk of a third party connecting with the network, by performing in S217 to S221 the user authentication to determine whether the user of the PC 1 matches the user of the mobile device 3, in which when both the users match, the mobile device 3 is automatically connected with the network by using the setting information obtained from the PC 1 via the second QR code image 153, whereas when both the users do not match, the mobile device 3 is connected with the network by making a request for a password and receiving an input of an appropriate password.

The process of S217 in FIG. 8B may be omitted. In this case, in S219, the CPU 31 may perform the user authentication by comparing a user ID registered in the mobile device 3 with the user ID obtained in S209.

In each flowchart described in the present disclosure, a plurality of arbitrary steps may be changed in their execution order, or may be executed in parallel, to such an extent that there is no inconsistency in the processing contents and results.

Each process described in the present disclosure may be performed by at least one of hardware processors such as CPUs and ASICs, alone or in cooperation. Each process described in the present disclosure may be achieved in various forms such as a method and a non-transitory computer-readable storage medium storing computer-readable instructions for performing each process.

In the aforementioned illustrative embodiment, the installer 22 is configured to generate the access information based on the URL stored in the URL information 24, and cause the user I/F 13 of the PC 1 to display the first QR code image representing the generated access information. Further, the installer 22 is configured to obtain the setting information from the MFP 5 in the installation process to install the print application 23 into the PC 1, generate the second QR code image representing the obtained setting information, and display the generated second QR code image on the user I/F 13 of the PC 1. However, instead of displaying the first and second QR code images on the user I/F 13, the installer 22 may cause the PC 1 to output the first and second QR code images by printing out the first and second QR code images using a printer. Further, in the aforementioned illustrative embodiment, the PC 1 and the mobile device 3 have their respective different platforms. However, the PC 1 and the mobile device 3 may have the same platform. Examples of the platform for the PC 1 may include, but are not limited to, Windows ("Windows" is a registered trademark of Microsoft Corp.), macOS ("macOS" is a registered trademark of Apple Inc.), Linux ("Linux" is a registered trademark of Linus Torvalds), Chrome OS ("Chrome OS" is a registered trademark of Google LLC), and UOS ("UOS" is a registered trademark of Uniontech Software Technology Co., Ltd.). Examples of the platform for the mobile device 3 may include, but are not limited to, iOS ("iOS" is a registered trademark of Cisco Systems, Inc.), Android ("Android" is a registered trademark of Google LLC), and HarmonyOS ("HarmonyOS" is a registered trademark of Huawei Technologies Co., Ltd.). Any combination may be applied as a combination of one of the available choices for the platform for the PC 1 and one of the available choices for the platform for the mobile device 3.

The following shows examples of associations between elements exemplified in the aforementioned illustrative embodiments and modifications and elements according to aspects of the present disclosure. The system 100 may be an example of a "system" according to aspects of the present disclosure. The PC 1 may be an example of a "first terminal device" according to aspects of the present disclosure, and may be an example of an "information processing device" according to aspects of the present disclosure. The mobile device 3 may be an example of a "second terminal device" according to aspects of the present disclosure, and may be an example of "another information processing device" according to aspects of the present disclosure. However, in another instance, the mobile device 3 may be an example of the "first terminal device" according to aspects of the present disclosure, and may be an example of the "information processing device" according to aspects of the present disclosure. In this case, the PC 1 may be an example of the "second terminal device" according to aspects of the present disclosure, and may be an example of the "another information processing device" according to aspects of the present disclosure. The MFP 5 may be an example of an "image processing apparatus" according to aspects of the present disclosure. The controller 10 of the PC 1 may be an example of a "controller" of the "information processing device" according to aspects of the present disclosure, and may be an example of a "first controller" of the "first terminal device" according to aspects of the present disclosure. The CPU 11 may be an example of a "processor" of the "first terminal device" according to aspects of the present disclosure, and may be an example of a "processor" included in the "controller" of the "information processing device" according to aspects of the present disclosure. The memory 12 storing the installer 22 may be an example of a "non-transitory computer-readable medium" storing "computer-readable instructions" according to aspects of the present disclosure, and may be an example of a "memory" storing "computer-readable instructions" that is included in the "controller" of the "information processing device" according to aspects of the present disclosure. The print application 23 may be an example of a "first program" according to aspects of the present disclosure, and may be an example of a "first-platform-compatible program" according to aspects of the present disclosure. The print application 43 may be an example of a "second program" according to aspects of the present disclosure, and may be an example of a "second-platform-compatible program" according to aspects of the present disclosure. The controller 30 of the mobile device 3 may be an example of a "second controller" of the "second terminal device" according to aspects of the present disclosure. The user I/F 13 of the PC 1 may be an example of a "display" of the "first terminal device" according to aspects of the present disclosure, may be an example of a "display" of the "information processing device" according to aspects of the present disclosure, and may be an example of a "first display" of the "first terminal device" according to aspects of the present disclosure. The user I/F 33 of the mobile device 3 may be an example of a "second display" of the "second terminal device" according to aspects of the present disclosure. The reading device 35 of the mobile device 3 may be an example of a "reading device" of the "second terminal device" according to aspects of the present disclosure.

What is claimed is:

1. A non-transitory computer-readable medium storing computer-readable instructions that are executable by a processor of a first terminal device compatible with a first platform, the instructions being configured to, when executed by the processor, cause the first terminal device to: accept selection of an image processing apparatus from among one or more devices connected with the first terminal device; obtain setting information from the selected image processing apparatus; install, into the first terminal device, a first program compatible with the selected image processing apparatus and the first platform; display access information on a display of the first terminal device, the access information being based on an address of a web page representing a site of a supply source for a second program, the second program being compatible with the selected image processing apparatus and a second platform; and display the obtained setting information on the display of the first terminal device; wherein the access information is configured to, when displayed on the display of the first terminal device and read by a second terminal device compatible with the second platform, cause the second terminal device to obtain the access information, thereby enabling the second terminal device to access the address represented by the access information and to obtain and display the web page representing the site of the supply source for the second program, and wherein the setting information is configured to, when displayed on the display of the first terminal device and read by the second terminal device, cause the second terminal device to obtain the setting information, thereby enabling the second terminal device to configure settings for using the image processing apparatus based on the setting information.

2. The non-transitory computer-readable medium according to claim 1, wherein the setting information contains specific information for specifying the image processing apparatus, and wherein the setting information is further configured to, when displayed on the display of the first terminal device and read by the second terminal device, cause the second terminal device to obtain the setting information containing the specific information, thereby enabling the second terminal device to select the image processing apparatus specified by the specific information.

3. The non-transitory computer-readable medium according to claim 1, wherein the setting information contains connection information used for connection with a network connected with the image processing apparatus, and wherein the setting information is further configured to, when displayed on the display of the first terminal device and read by the second terminal device, cause the second terminal device to obtain the setting information containing the connection information, thereby enabling the second terminal device to configure settings for connecting the second terminal device with the network based on the connection information.

4. The non-transitory computer-readable medium according to claim 1,
wherein the instructions are further configured to, when executed by the processor, cause the first terminal device to:
display, on the display of the first terminal device, a first code image generated by encoding the access information; and
display, on the display of the first terminal device, a second code image generated by encoding the setting information.

5. The non-transitory computer-readable medium according to claim 1,
wherein the instructions are further configured to, when executed by the processor, cause the first terminal device to:
when receiving an instruction to display the setting information after the access information has been displayed, terminate the display of the access information and display the setting information on the display of the first terminal device.

6. An information processing device comprising: a display; and a controller configured to: accept selection of an image processing apparatus from among one or more devices connected with the information processing device, the information processing device being compatible with a first platform; obtain setting information from the selected image processing apparatus; display access information on the display, the access information being based on an address of a web page representing a site of a supply source for a second-platform-compatible program, the second-platform-compatible program being compatible with the selected image processing apparatus and a second platform; and display the obtained setting information on the display; wherein the access information is configured to, when displayed on the display of the information processing device and read by another information processing device compatible with the second platform, cause the another information processing device to obtain the access information, thereby enabling the another information processing device to access the address represented by the access information and to obtain and display the web page representing the site of the supply source for the second-platform-compatible program, and wherein the setting information is configured to, when displayed on the display of the information processing device and read by another information processing device, cause the another information processing device to obtain the setting information, thereby enabling the another information processing device to configure settings for using the image processing apparatus based on the setting information.

7. The information processing device according to claim 6,
wherein the controller is further configured to:
install, into the information processing device, a first-platform-compatible program compatible with the selected image processing apparatus and the first platform; and
after completion of the installation of the first-platform-compatible program, display the access information on the display.

8. The information processing device according to claim 6,
wherein the controller comprises:
a processor; and
a memory storing computer-readable instructions configured to, when executed by the processor, cause the controller to:
accept the selection of the image processing apparatus;
obtain the setting information from the selected image processing apparatus;
display the access information on the display; and
display the obtained setting information on the display.

9. A system comprising:
an image processing apparatus;
a first terminal device compatible with a first platform: and
a second terminal device compatible with a second platform,
wherein the first terminal device comprises:
a first display; and
a first controller configured to:
accept selection of an image processing apparatus from among one or more devices connected with the first terminal device;
obtain setting information from the selected image processing apparatus;
install, into the first terminal device, a first program compatible with the selected image processing apparatus and the first platform;
display access information on the first display, the access information being based on an address of a web page representing a site of a supply source for a second program, the second program being compatible with the selected image processing apparatus and the second platform; and
display the obtained setting information on the first display, and
wherein the second terminal device comprises:
a reading device;
a second display; and
a second controller configured to:
read, by the reading device, the access information displayed on the first display of the first terminal device, thereby obtaining the access information;
access the address represented by the obtained access information, obtain the web page corresponding to the selected function, and display the obtained web page on the second display;
read, by the reading device, the setting information displayed on the first display of the first terminal device, thereby obtaining the setting information; and
configure settings for using the image processing apparatus based on the setting information.

10. The system according to claim 9,
wherein the second controller of the second terminal device is further configured to, after displaying the web page and before obtaining the setting information, provide a notification for causing the first terminal device to display the setting information and reading, by the reading device, the setting information displayed on the first terminal device.

11. The system according to claim 9,
wherein the first controller of the first terminal device is further configured to obtain the setting information containing specific information that specifies the image processing apparatus, and
wherein the second controller of the second terminal device is further configured to select the image processing apparatus specified by the specific information contained in the setting information.

12. The system according to claim 9,
wherein the first controller of the first terminal device is further configured to obtain the setting information containing connection information used for connection with a network connected with the image processing apparatus, and
wherein the second controller of the second terminal device is further configured to configure settings for connecting the second terminal device with the network based on the connection information contained in the setting information.

13. The system according to claim 12,
wherein the first controller of the first terminal device is further configured to obtain the setting information further containing first authentication information used for user authentication, the connection information including identification information for identifying the network, and a first password, and
wherein the second controller of the second terminal device is further configured to:
obtain second authentication information;
determine whether the first authentication information contained in the setting information matches the obtained second authentication information;
when determining that the first authentication information matches the second authentication information, connect the second terminal device with the network based on the connection information, thereby connecting the second terminal device with the image processing device via the network; and
when determining that the first authentication information does not match the second authentication information,
display the identification information included in the connection information on the second display,
receive an input of a second password,
determine whether the first password included in the connection information matches the input second password,
when determining that the first password matches the second password, connect the second terminal device with the network based on the connection information, thereby connecting the second terminal device with the image processing device via the network, and
when determining that the first password do not match the second password, not connect the second terminal device with the network.

* * * * *